(12) United States Patent
Khairallah

(10) Patent No.: US 10,449,632 B2
(45) Date of Patent: Oct. 22, 2019

(54) SPATTER REDUCTION LASER SCANNING STRATEGY IN SELECTIVE LASER MELTING

(71) Applicant: LAWRENCE LIVERMORE NATIONAL SECURITY, LLC, Livermore, CA (US)

(72) Inventor: Saad Khairallah, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 16/252,002

(22) Filed: Jan. 18, 2019

(65) Prior Publication Data

US 2019/0151986 A1    May 23, 2019

Related U.S. Application Data

(62) Division of application No. 14/882,762, filed on Oct. 14, 2015, now Pat. No. 10,220,471.

(51) Int. Cl.

| | |
|---|---|
| *B23K 26/066* | (2014.01) |
| *B33Y 30/00* | (2015.01) |
| *B33Y 10/00* | (2015.01) |
| *B23K 26/0622* | (2014.01) |
| *B23K 26/342* | (2014.01) |
| *B22F 3/105* | (2006.01) |
| *B29C 64/153* | (2017.01) |
| *B29C 64/20* | (2017.01) |
| *B33Y 50/02* | (2015.01) |

(52) U.S. Cl.
CPC ........ *B23K 26/066* (2015.10); *B22F 3/1055* (2013.01); *B23K 26/0622* (2015.10); *B23K 26/342* (2015.10); *B29C 64/153* (2017.08); *B29C 64/20* (2017.08); *B33Y 10/00* (2014.12); *B33Y 30/00* (2014.12); *B22F 2003/1056* (2013.01); *B33Y 50/02* (2014.12); *Y02P 10/295* (2015.11)

(58) Field of Classification Search
CPC .................................................. B23K 26/066
See application file for complete search history.

(56) References Cited

U.S. PATENT DOCUMENTS

| | | |
|---|---|---|
| 4,944,817 A | 7/1990 | Bourell et al. |
| 5,155,324 A | 10/1992 | Deckard et al. |
| 2013/0136868 A1* | 5/2013 | Bruck ............... B05D 3/06 427/554 |

* cited by examiner

*Primary Examiner* — Larry W Thrower
(74) *Attorney, Agent, or Firm* — Eddie E. Scott

(57) ABSTRACT

An additive manufacturing system wherein a gentle sintering run on heat-fusible particles is followed closely by a selective laser melting run. The laser sintering run slightly sinters the particles and causes the particles to adhere to each other, but not necessarily deform and lose their original shape. The particles become connected via bridges between each other, which holds them in place. During the laser melting run, the powder melts in place, with minimum particle ejection or mobility, since the particles form a network of connected particles.

5 Claims, 4 Drawing Sheets

SPATTER REDUCTION LASER SCANNING STRATEGY IN SELECTIVE LASER MELTING

CROSS-REFERENCE TO RELATED APPLICATIONS the present application is a Division of application Ser. No. 14/882,762 filed Oct. 14, 2015, the disclosure of which is hereby incorporated by reference in its entirety for all purposes.

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to additive manufacturing and more particularly to spatter reduction laser scanning strategy in selective laser melting.

State of Technology

This section provides background information related to the present disclosure which is not necessarily prior art.

U.S. Pat. No. 4,944,817 for multiple material systems for selective beam sintering issued Jul. 31, 1990 to David L. Bourell et al and assigned to Board of Regents, The University of Texas System provides the state of technology information reproduced below.

A method and apparatus for selectively sintering a layer of powder to produce a part comprising a plurality of sintered layers. The apparatus includes a computer controlling a laser to direct the laser energy onto the powder to produce a sintered mass. The computer either determines or is programmed with the boundaries of the desired cross-sectional regions of the part. For each cross-section, the aim of the laser beam is scanned over a layer of powder and the beam is switched on to sinter only the powder within the boundaries of the cross-section. Powder is applied and successive layers sintered until a completed part is formed.

U.S. Pat. No. 5,155,324 for a method for selective laser sintering with layerwise cross-scanning issued Oct. 12, 1992 to Carl R, Deckard et al, University of Texas at Austin, provides the state of technology information reproduced below.

Selective laser sintering is a relatively new method for producing parts and other freeform solid articles in a layer-by-layer fashion. This method forms such articles by the mechanism of sintering, which refers to a process by which particulates are made to form a solid mass through the application of external energy. According to selective laser sintering, the external energy is focused and controlled by controlling the laser to sinter selected locations of a heat-fusible powder. By performing this process in layer-by-layer fashion, complex parts and freeform solid articles which cannot be fabricated easily (if at all) by subtractive methods such as machining can be quickly and accurately fabricated. Accordingly, this method is particularly beneficial in the production of prototype parts, and is particularly useful in the customized manufacture of such parts and articles in a unified manner directly from computer-aided-design (CAD) or computer-aided-manufacturing (CAM) data bases.

Selective laser sintering is performed by depositing a layer of a heat-fusible powder onto a target surface; examples of the types of powders include metal powders, polymer powders such as wax that can be subsequently used in investment casting, ceramic powders, and plastics such as ABS plastic, polyvinyl chloride (PVC), polycarbonate and other polymers. Portions of the layer of powder corresponding to a cross-sectional layer of the part to be produced are exposed to a focused and directionally controlled energy beam, such as generated by a laser having its direction controlled by mirrors, under the control of a computer. The portions of the powder exposed to the laser energy are sintered into a solid mass in the manner described hereinabove. After the selected portions of the layer have been so sintered or bonded, another layer of powder is placed over the layer previously selectively sintered, and the energy beam is directed to sinter portions of the new layer according to the next cross-sectional layer of the part to be produced. The sintering of each layer not only forms a solid mass within the layer, but also sinters each layer to previously sintered powder underlying the newly sintered portion. In this manner, the selective laser sintering method builds a part in layer-wise fashion, with flexibility, accuracy, and speed of fabrication superior to conventional machining methods.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventor's systems fall under the additive manufacturing suite of methods. The new methods consist of an energy scanning strategy that fixates the particles before a melting run. This has numerous advantages such as to minimize spatter and particle motion and to extend additive manufacturing application to any pressure including vacuum. Spatter is defined as the ejection of particles, solid or molten, from the powder bed. The energy can originate from any energetic beam such as a laser beam or an electron beam. The scanning deposition method does not have to be limited to a single source at any time nor does it have to be a point source like with a laser and it can span a large source region with a given pattern such as with projection lithography. In the inventor's apparatus, systems, and methods a gentle sintering run is followed closely by a selective laser melting run. The gentle laser sintering run slightly sinters the particles. The intent is to cause the particles to adhere to each other, but not necessarily deform and lose their original shape. The particles may get connected via bridges between each other, which holds them in place. The sintered area should cover as wide of a region as it is necessary to minimize unwanted particle mobility during the melting phase of the additive process. During the laser melting run, the powder melts in place, with minimum particle ejection or mobility, since the particles form a network of connected particles. This is in contrast to disconnected particles that would be free to move, pop from place and be ejected or spattered. The inventor's apparatus, systems, and methods increases accuracy and quality of the part built.

The inventor's apparatus, systems, and methods have a number of advantages. For example, they can perform laser scan of powder with much less spatter and produce more uniform melt tracks. In the prior art systems spatter landing on a freshly consolidated melt track can form an incomplete weld with that surface. This can prevent a uniform powder spreading on top of the consolidated melt track. The outcome can be the creation of porosities, which is detrimental to the part quality.

The powder used in SLM is expensive. With the inventor's apparatus, systems, and methods spatter is minimized, the powder particle distribution will remain the same after multiple uses, hence, improving the re-use (recyclability) of the powder and minimizing waste.

In the prior art systems there is evidence that SLM is not possible in zero pressure atmosphere (outer space) and is rendered difficult in low pressure atmosphere. With the inventor's apparatus, systems, and methods the SLM can be extended to any pressure conditions.

The inventor's apparatus, systems, and methods applies enough gentle laser sintering scans so that the powder track is preheated, which can reduce the thermal residual stress build up during the subsequent melting run, which can then improve the build quality.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
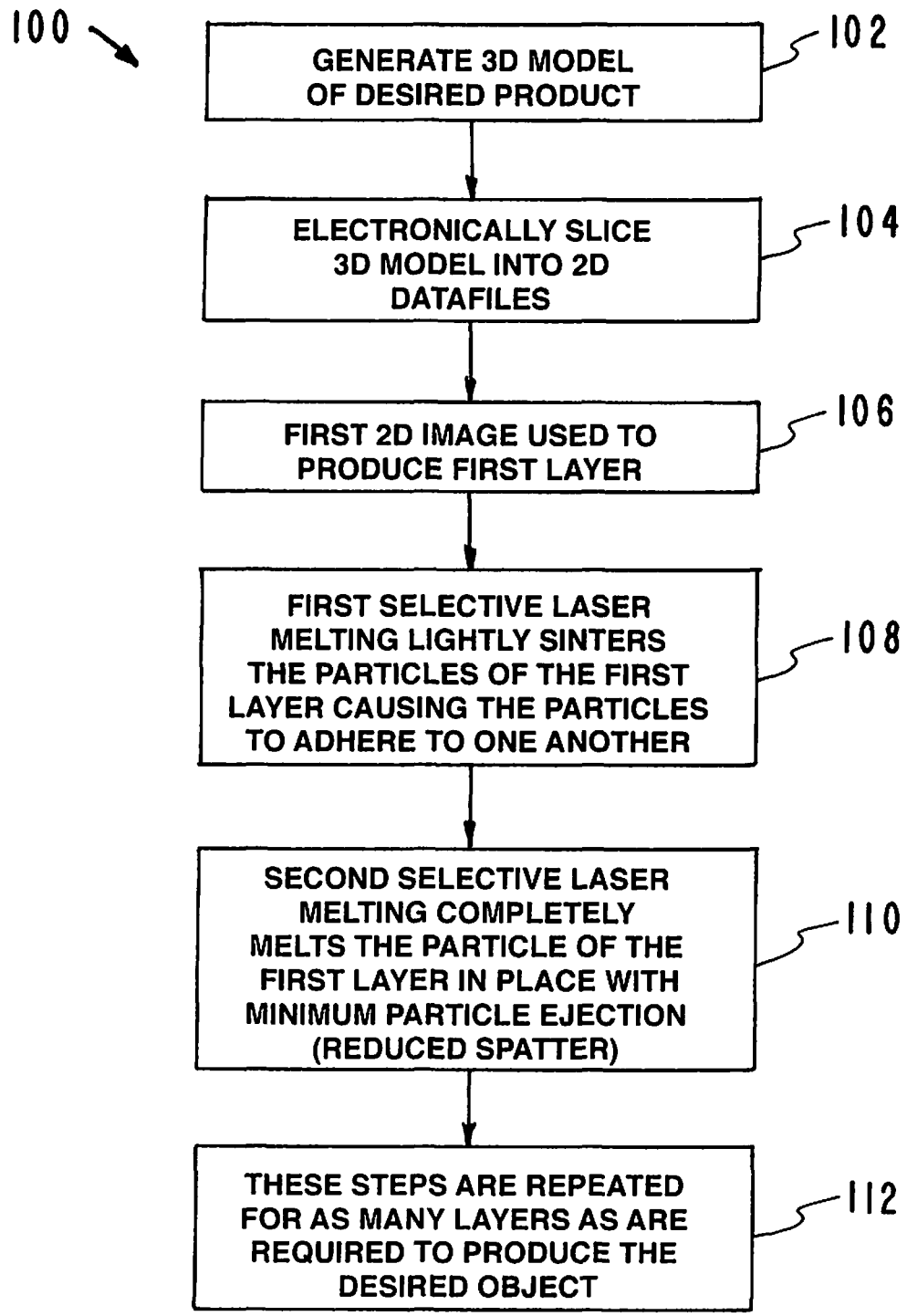
FIG. 1 is a flow chart illustrates one embodiment of the inventor's apparatus, systems, and methods.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

The present application relates to additive manufacturing, which is also referred to as 3D printing. This manufacturing process consists of manufacturing articles layer upon layer. The process consists of applying an energy source that fuses (melts and solidifies) particle powder in a layer according to some pattern. The melted particles adhere to the previous layer and in turn form the basis for the next subsequent layer. The fusion process is repeated layer by layer until a full part is built. The application in consideration applies more particularly to the energy application procedure. A scanning strategy is proposed to fixate the particles before complete melting and formation of a melt track or pattern. This is advantageous for numerous reasons, some of which is to minimize defects by minimizing spatter and other particle motion, perform selective laser or electron beam melting under vacuum or low pressure conditions. In this document, SLM stands for selective laser melting and SLS stands for selective laser sintering. The proposed method can also be applied to ebeam (electron beam based technologies).

The inventor's apparatus, systems, and methods fall under the additive manufacturing suite of methods. The new method consists of an energy scanning strategy that fixates the particles before a melting run. This has numerous advantages such as to minimize spatter and particle motion and to extend additive manufacturing application to any pressure including vacuum. Spatter is defined as the ejection of particles, solid or molten, from the powder bed. The energy can originate from any energetic beam such as a laser beam or an electron beam. The scanning deposition method does not have to be limited to a single source at any time nor does it have to be a point source like with a laser and it can span a large source region with a given pattern such as with projection lithography. In the inventor's apparatus, systems, and methods a gentle sintering run is followed closely by a selective laser melting run. The gentle laser sintering run slightly sinters the particles. The intent is to cause the particles to adhere to each other, but not necessarily deform and lose their original shape. The particles may get connected via bridges between each other, which holds them in place. The sintered area should cover as wide of a region as it is necessary to minimize unwanted particle mobility during the melting phase of the additive process. During the laser melting run, the powder melts in place, with minimum particle ejection or mobility, since the particles form a network of connected particles. This is in contrast to disconnected particles that would be free to move, pop from place and be ejected or spattered.

Definitions

As used in this application the terms below have the definitions provided.

"Sintering Run" or "Gentle Sintering Run" means processing powder particles using any energetic beam such as a laser beam or an electron beam to cause the particles to adhere to each other (and in some instances to a substrate) but not necessarily deform and lose their original shape.

"Melting Run" or "Laser Melting Run" or "Selective Laser Melting Run" means processing powder particles using any energetic beam such as a laser beam or an electron beam to melt the particles in place.

Additive manufacturing, or 3D printing, is the process of turning digital designs into three-dimensional objects. It is a convenient and affordable way to make prototypes as well as finished products, making it popular with businesses, hobbyists and inventors. One of the technologies used by today's 3D printers is called selective laser sintering (SLS). SLS is a manufacturing technology that was created in the 1980s at The University of Texas at Austin. During SLS, tiny particles of plastic, ceramic or glass are fused together by heat from a high-power laser to form a solid, three-dimensional object. Another technologies used by today's 3D printers is called selective laser melting (SLM). SLM is similar to SLS except that metal powder is used to form a three-dimensional product.

Like all methods of 3D printing, an object printed with an SLS or SLM machine starts as a computer-aided design (CAD) file. CAD files are converted to .STL format, which can be understood by a 3D printing apparatus. Objects printed with SLS or SLM are made with powder materials, most commonly plastics such as nylon in SLS, and metal powders in SLM, which are dispersed in a thin layer on top of the build platform inside an SLS or SLM machine. A laser, which is controlled by a computer that tells it what object to "print," pulses down on the platform, tracing a cross-section of the object onto the powder.

The inventor's apparatus, systems, and methods provide a spatter reduction laser scanning strategy in selective laser melting in additive manufacturing. Referring to the drawings and in particular to FIG. 1, a flow chart illustrates one embodiment of the inventor's apparatus, systems, and methods that provide a spatter reduction laser scanning strategy in selective laser melting in additive manufacturing. This embodiment is designated generally by the reference numeral 100. The system 100 produces a final product using the steps described below.

In the step designated by the reference numeral 102, a 3D model of the desired product is designed by any suitable method, e.g., by bit mapping or by computer aided design (CAD) software at a PC/controller.

In the step designated by the reference numeral 104, the CAD model of the desired product is electronically sliced into series of 2-dimensional data files, i.e., 2D layers, each defining a planar cross section through the model of the desired product. The 2-dimensional data files are stored and provide a digital image of the final product.

In the step designated by the reference numeral 106, the digital image is used in an additive manufacturing process to produce the final product. Particles are applied to a substrate in a layer by layer process to produce the final product. The digital image of the first 2D layer is used to produce the first layer of the desired product.

In the step designated by the reference numeral 108, the first layer particles are scanned with a purpose of gently sintering the particles in the powder bed. Step 108 results in building a network of interconnected particles (connected even to the substrate), so that when the full laser melting scan is started, the particles do not eject easily due to increased inertia of the network. In other words, the particles are not individually free to move. They have to move collectively which presents more inertia. The time scales of the problem are such that the laser scan is way much faster than the network of interconnected particles at motion.

The particle powder bed do not necessarily change morphology. The particles may retain their original shape. The impact is to heat the particles enough to cause them to form bridges that connect them.

After sintering, the particles are not really at point contact, but rather, they are connected by bridges. The bridge forms from surface melt, due to laser deposited energy on the particles, brought together by the surface tension and eventually solidifies into a bridge like structure. The bridge structure causes the particles to be harder to move or push around since now the particles are not individually free, but rather move collectively and their collective inertia is a lot higher than that of an individual particle.

Also, the sintering can cause the particles in touch with the substrate to also sinter against the substrate, so now the particles are also connected to the substrate. The end result of this gentle sintering scan is to create a network of interconnected particles and substrate that are hard to displace.

In the step designated by the reference numeral 110, a full melting scan of the first layer particles is completed. During the full melting scan 110, the powder melts in place, with minimum particle ejection, since the particles form a network of connected particles.

In the step designated by the reference numeral 112, the steps are repeated in a layer by layer process to produce the desired product.

Figure 2A:
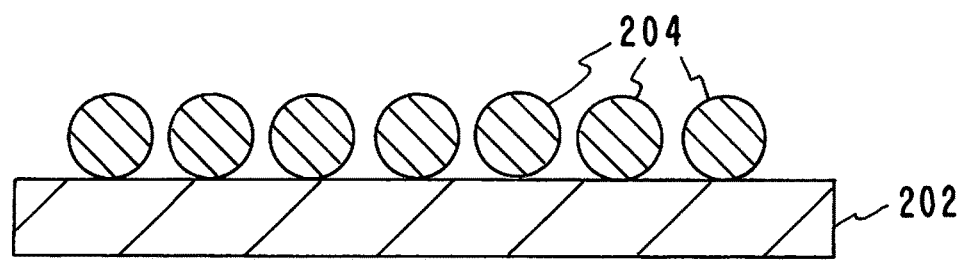
FIGS. 2A through 2F illustrate the inventor's apparatus, systems, and methods that provide a selective laser sintering run followed closely by a selective laser melting run.

The steps of the embodiment 100 illustrated in the flow chart of FIG. 1 are illustrated in greater detail in FIGS. 2A through 2F. The digital image of the first 2D layer is used to produce the first layer of the desired product. As illustrated in FIG. 2A, particles 204 are applied to substrate 202.

Figure 2B:
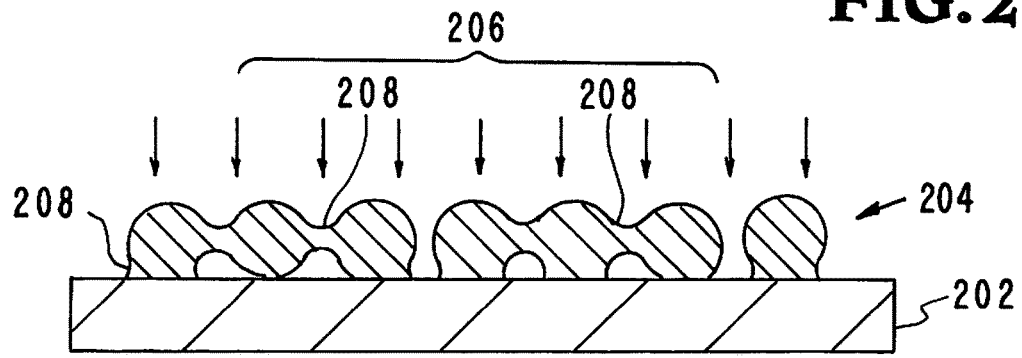

As illustrated in FIG. 2B, the selective laser sintering technique slightly sinters the particles. This causes the particles to adhere to each other. FIG. 2B shows the first layer 204 particles being by scanned by laser light 206 with a purpose of gently sintering the particles 204. The sintering is mild enough to cause the particles to build bridges 208 between each other which holds them in place. The sintering also causes the particles to build bridges 208 between the particles 204 and the substrate 202.

Figure 2C:
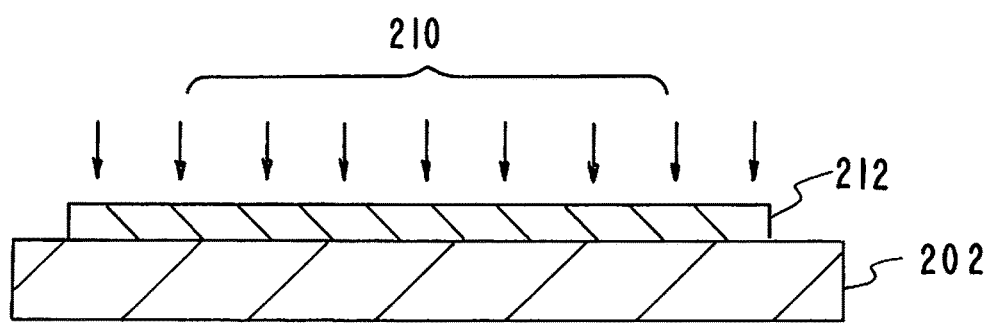

As illustrated in FIG. 2C, during the laser melting run, the powder particles 204 melt in place, with minimum particle ejection, since the particles form a network of connected particles. The full melting scan by laser light 210 results in the melted particles forming the first layer 212 of the product being produced.

Figure 2D:
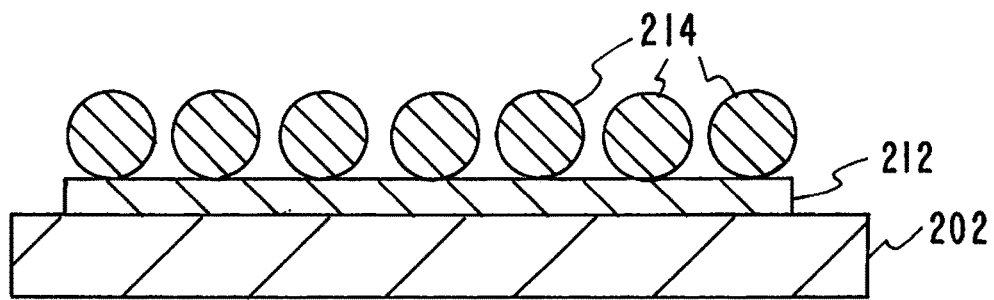

As illustrated in FIG. 2d, the production of the second layer of the product is started. A second layer of particles 214 is applied on top of the competed first layer 212.

Figure 2E:
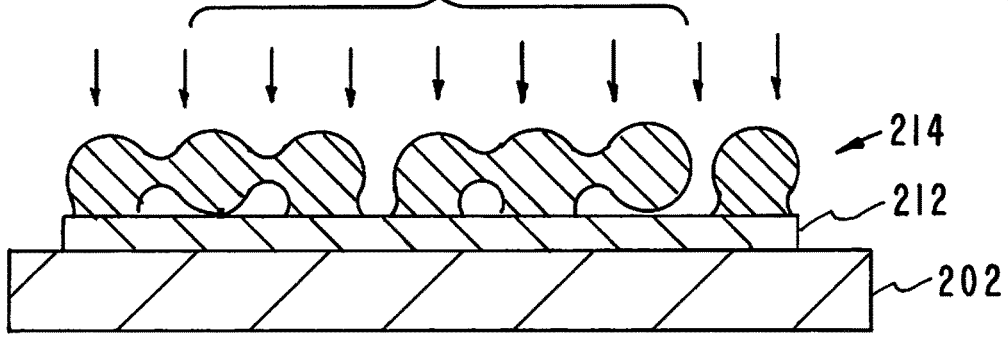

As illustrated in FIG. 2E, the selective laser sintering technique slightly sinters the second layer particles 214. This causes the particles 214 to adhere to each other, but not deform and lose their spherical shape. FIG. 2E shows the second layer particles 214 being by scanned by laser light 216 with a purpose of gently sintering the particles 214. The laser sintering run slightly sinters the particles 214. This causes the particles 214 to adhere to each other, but not deform and lose their spherical shape. The sintering is mild enough to cause the particles to build bridges between each other which holds them in place. The sintering also causes the particles 214 to build bridges between the particles 214 and the first layer 212.

Figure 2F:
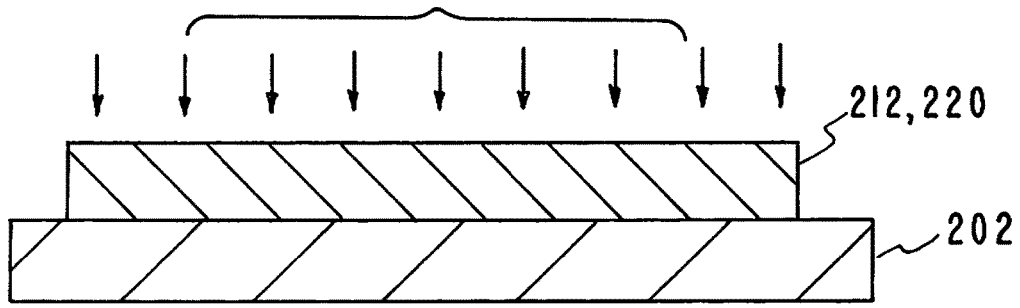

FIG. 2F illustrates the laser melting run on the second layer particles 214 which causes them to melt in place and form a second layer 220 that is attached to and forms with the first layer 212 to produce a combined first and second layer 212 & 220 of the product being produced. The steps of FIGS. 2A through 2F are repeated to form additional layers until the final product is produced.

Figure 3:
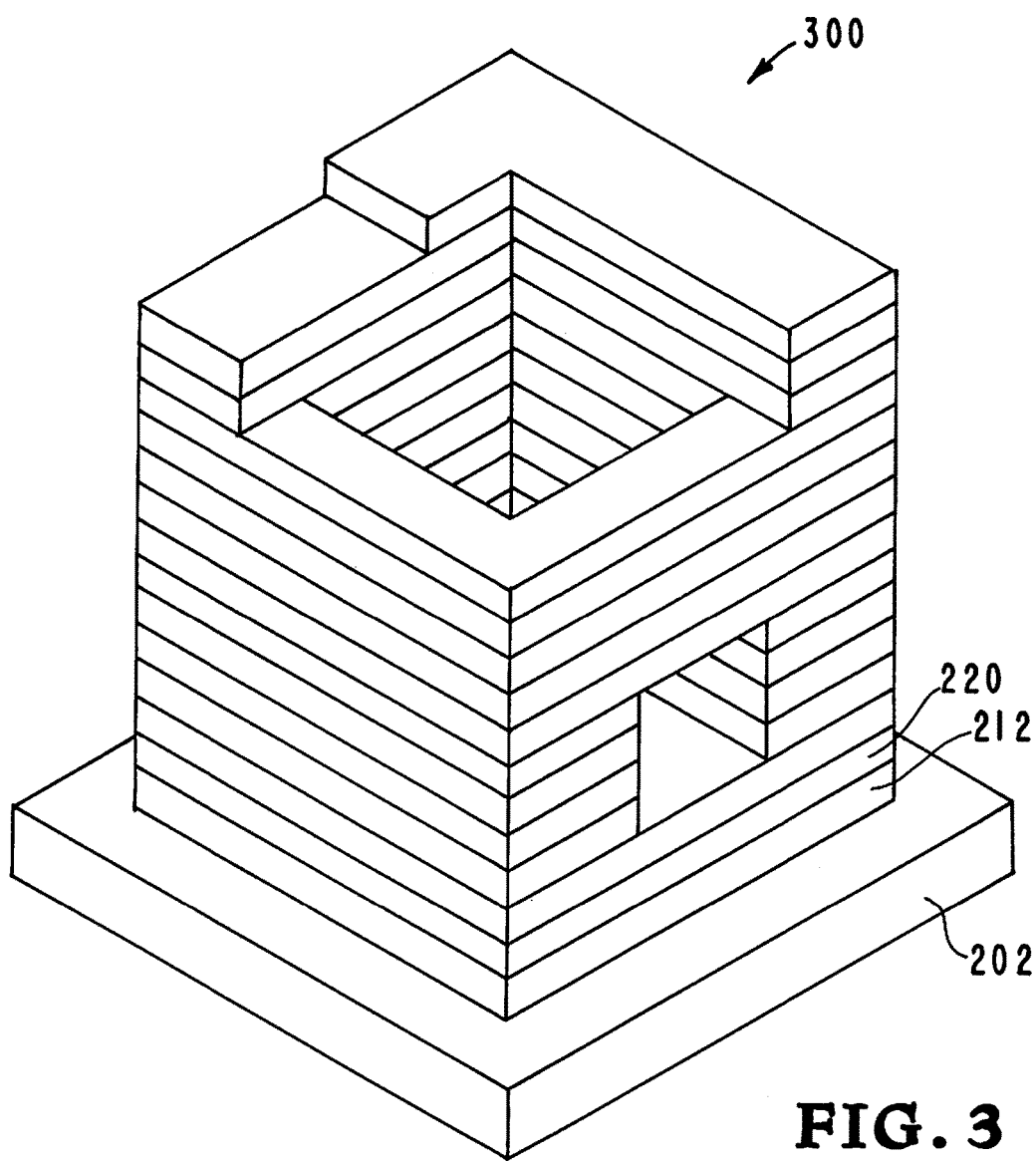
FIG. 3 illustrates one embodiment of the final product produced by the inventor's apparatus, systems, and methods.

Referring now to FIG. 3, an example of a product produced by the inventor's apparatus, systems, and methods shown in FIGS. 1 and 2A through 2F is illustrated. The product is designated generally by the reference numeral 300. The first layer 212 of the product 300 is shown on the substrate 202. The second layer 220 is shown on top of the first layer 212. Additional layers complete the product 300. Although the layers are discernable in FIG. 3 it is to be understood that this for illustration purposes and the final product will be uniform and smooth.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The claims are:

1. A method of additive manufacturing for producing a product using a substrate, comprising:
    disposing a first layer of first heat-fusible particles on the substrate;
    implementing a first sintering run on said first heat-fusible powder particles that causes said first heat-fusible powder particles to adhere to each other, causes said first heat-fusible powder particles to build bridges between each other and hold them in place, and causes said first heat-fusible powder particles to adhere to said substrate, wherein said step of implementing a first sintering run produces first sintered heat-fusible powder particles;
    implementing a first melting run on said first sintered heat-fusible powder particles, wherein said step of implementing a first melting run results in said first sintered heat-fusible powder particles being melted and forming a first layer of the product;
    disposing a second layer of second heat-fusible particles on said first layer of the product;
    implementing a second sintering run on said second heat-fusible powder particles that causes said second heat-fusible powder particles to adhere to each other, causes said second heat-fusible powder particles to build bridges between each other and hold them in place, and causes said second heat-fusible powder particles to adhere to said first layer of the product, wherein said step of implementing a second sintering run produces second sintered heat-fusible powder particles;
    implementing a second melting run on said second heat-fusible powder particles, wherein said step of implementing a second melting run results in said second sintered heat-fusible powder particles being melted and forming a second layer of the product;
    disposing additional layers of additional heat-fusible particles on said second layer of the product;
    implementing additional sintering runs on said additional heat-fusible powder particles that causes said additional heat-fusible powder particles to adhere to each other, causes said additional heat-fusible powder particles to build bridges between each other and hold them in place, and causes said additional heat-fusible powder particles to adhere to said second layer of the product, wherein said step of implementing additional sintering runs produces additional sintered heat-fusible powder particles; and
    implementing additional melting runs on said sintered additional heat-fusible powder particles that results in said additional sintered heat-fusible powder particles being melted thereby forming additional layers of the product.

2. The method of additive manufacturing for producing a product using a substrate of claim 1 wherein said step of implementing a first sintering run on said first heat-fusible powder particles comprises implementing a first laser sintering run on said first heat-fusible powder particles.

3. The method of additive manufacturing for producing a product using a substrate of claim 1 wherein said step of implementing a first sintering run on said heat-fusible powder particles comprises implementing a first electron beam sintering run on said first heat-fusible powder particles.

4. The method of additive manufacturing for producing a product using a substrate of claim 1 wherein said step of implementing a first melting run on said first heat-fusible powder particles comprises implementing a first laser melting run on said first heat-fusible powder particles.

5. The method of additive manufacturing for producing a product using a substrate of claim 1 wherein said step of implementing a first melting run on said first heat-fusible powder particles comprises implementing a first electron beam melting run on said first heat-fusible powder particles.

* * * * *